United States Patent
Chan et al.

(10) Patent No.: US 7,126,787 B2
(45) Date of Patent: Oct. 24, 2006

(54) SYSTEM AND METHOD FOR HARD DISK DRIVE WITH DISK CLAMP ANNULAR RIM INNER WALL ENGAGING HUB ANNULAR RECESS OUTER WALL

(75) Inventors: Andre Sirilutporn Chan, Milpitas, CA (US); Ta-Chang Fu, San Jose, CA (US); Andrew Keith Hanlon, San Jose, CA (US); Steven Alf Hanssen, San Jose, CA (US); Tisha Jefferson, Lynchburg, VA (US); Kunihiro Shida, San Jose, CA (US); Jr-Yi Shen, Cupertino, CA (US); Stanley Yen Wong, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/158,485

(22) Filed: Jun. 22, 2005

(65) Prior Publication Data

US 2006/0002013 A1 Jan. 5, 2006

Related U.S. Application Data

(62) Division of application No. 10/606,140, filed on Jun. 25, 2003, now Pat. No. 6,961,216.

(51) Int. Cl.
*G11B 17/028* (2006.01)
*G11B 17/038* (2006.01)

(52) U.S. Cl. .............................. 360/99.12; 360/98.08
(58) Field of Classification Search ............ 360/99.12, 360/98.08
See application file for complete search history.

(56) References Cited

U.S. PATENT DOCUMENTS

| | | | |
|---|---|---|---|
| 5,694,269 A | | 12/1997 | Lee |
| 5,822,151 A | * | 10/1998 | Albrecht et al. ......... 360/98.08 |
| 6,205,113 B1 | * | 3/2001 | Fahey et al. ................ 720/722 |
| 6,874,219 B1 | * | 4/2005 | Hanssen et al. ......... 360/99.12 |
| 7,016,147 B1 | * | 3/2006 | Choo et al. .............. 360/99.12 |

* cited by examiner

*Primary Examiner*—Craig A. Renner
(74) *Attorney, Agent, or Firm*—Bracewell & Giuliani LLP

(57) ABSTRACT

A disk clamp for securing data storage disks to the hub of a spindle motor in a hard disk drive has a circumferential rib protruding from a lower surface of the disk clamp. A complementary recess is formed in the hub of the spindle motor for closely receiving the rib on the disk clamp. The inner diameter of the rib and the outer diameter of the recess are closely toleranced to provide a very precise centering feature for mounting and aligning the disk clamp with respect to the hub and spindle motor. This design reduces the complexity of the tooling and fixtures required to complete the assembly and the overall part cost is reduced.

9 Claims, 4 Drawing Sheets

SYSTEM AND METHOD FOR HARD DISK DRIVE WITH DISK CLAMP ANNULAR RIM INNER WALL ENGAGING HUB ANNULAR RECESS OUTER WALL

RELATED APPLICATIONS

This Divisional Application claims priority to U.S. patent application Ser. No. 10/606,140, filed on Jun. 25, 2003, patented on Nov. 1, 2005, as U.S. Pat. No. 6,961,216.

BACKGROUND OF THE INVENTION

1. Technical Field

The present invention relates in general to an improved hard disk drive and, in particular, to an improved system, method, and apparatus for centering and attaching a disk clamp to the hub of a spindle motor in a hard disk drive.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked vertically on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

The attachment of the data storage disks to the hub of the spindle motor is accomplished via a disk clamp. The disk clamp retains the disks on the hub by attaching directly to the hub of the motor. It is very important to precisely center the disk clamp to the hub in order to reduce installation-induced mass imbalance. A conventional disk clamp 11 (FIG. 5) is typically centered on the spindle motor 13 by providing a rib 15 on top of the spindle motor hub 17. The rib 15 protrudes upward from the hub 17 and has an outer diameter 19 on which an inner diameter 21 of the disk clamp 11 is positioned and thereby centered. Moreover, very precise and expensive tooling is required to properly center and align the disk clamp 11 and hub 17. Although this design is workable, an improved system, method, and apparatus for attaching and centering a disk clamp on the hub of a spindle motor in a hard disk drive would be desirable.

SUMMARY OF THE INVENTION

One embodiment of a disk clamp for securing data storage disks to the hub of a spindle motor in a hard disk drive has a circumferential rib protruding from a lower surface of the disk clamp. A complementary recess is formed in the hub of the spindle motor for closely receiving the rib on the disk clamp. The inner diameter of the rib and the outer diameter of the recess are closely toleranced to provide a very precise centering feature for mounting and aligning the disk clamp with respect to the hub and spindle motor. In an alternate embodiment, the disk clamp is provided with a central aperture that directly engages an end of the upper bearing sleeve which protrudes from the spindle motor hub. In this version, the inner diameter of the aperture and the outer diameter of the bearing sleeve are closely toleranced to provide a very precise centering feature for mounting and aligning the disk clamp with respect to the hub and spindle motor. The present design reduces the complexity of the tooling and fixtures required to complete the assembly and the overall part cost is reduced.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF A PREFERRED EMBODIMENT

Figure 1:
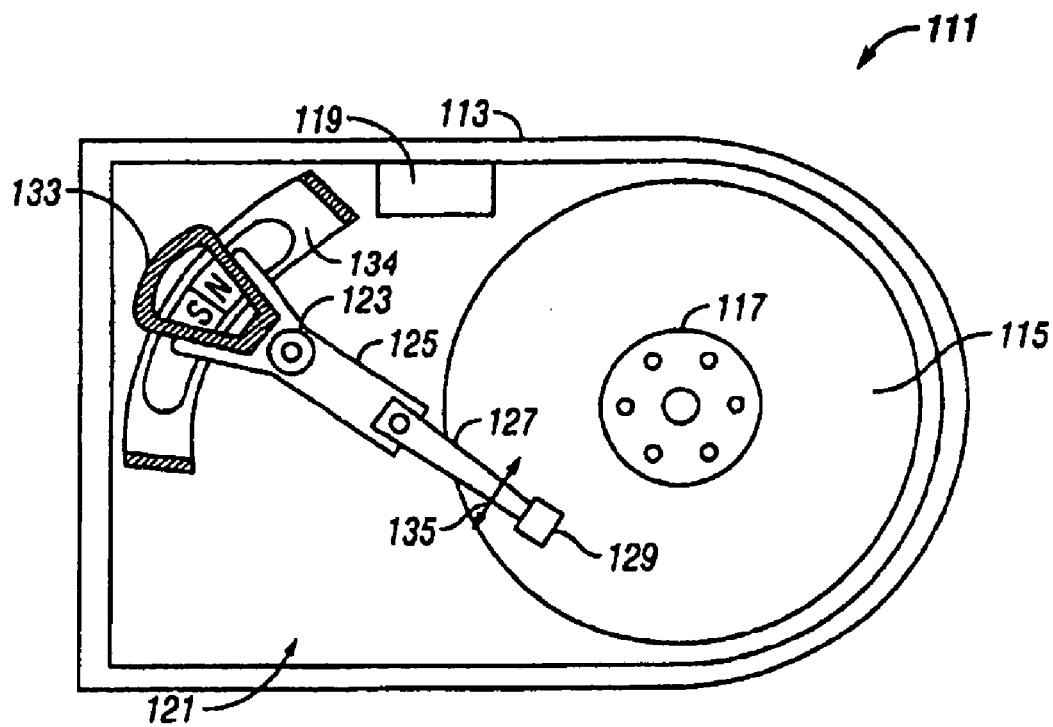
FIG. 1 is a simplified plan view of one embodiment of a hard disk drive constructed in accordance with the present invention.

Referring to FIG. 1, a schematic drawing of one embodiment of an information storage system comprising a magnetic hard disk file or drive 111 for a computer system is shown. Drive 111 has an outer housing or base 113 containing a plurality of stacked, parallel magnetic disks 115 (one shown) which are closely spaced apart. Disks 115 are rotated by a spindle motor assembly having a central drive hub assembly 117. An actuator 121 comprises a plurality of parallel actuator arms 125 (one shown) in the form of a comb that is pivotally mounted to base 113 about a pivot assembly 123. A controller 119 is also mounted to base 113 for selectively moving the comb of arms 125 relative to disks 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disks 115. The level of integration called the head gimbal assembly is head and the slider 129, which are mounted on suspension 127. The slider 129 is usually bonded to the end of suspension 127. The head is typically pico size (approximately 1250×1000×300 microns) and formed from ceramic or intermetallic materials. The head also may be nano size (approximately 850×700×230 microns) and is pre-loaded against the surface of disk 115 (in the range two to ten grams) by suspension 127.

Suspensions 127 have a spring-like quality which biases or urges the air bearing surface of the slider 129 against the disk 115 to enable the creation of the air bearing film between the slider 129 and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies radially across tracks on the disks 115 until the heads settle on their respective target tracks. The head gimbal assemblies operate in a conventional manner and always move in unison with one another, unless drive 111 uses multiple independent actuators (not shown) wherein the arms can move independently of one another.

Figure 2:
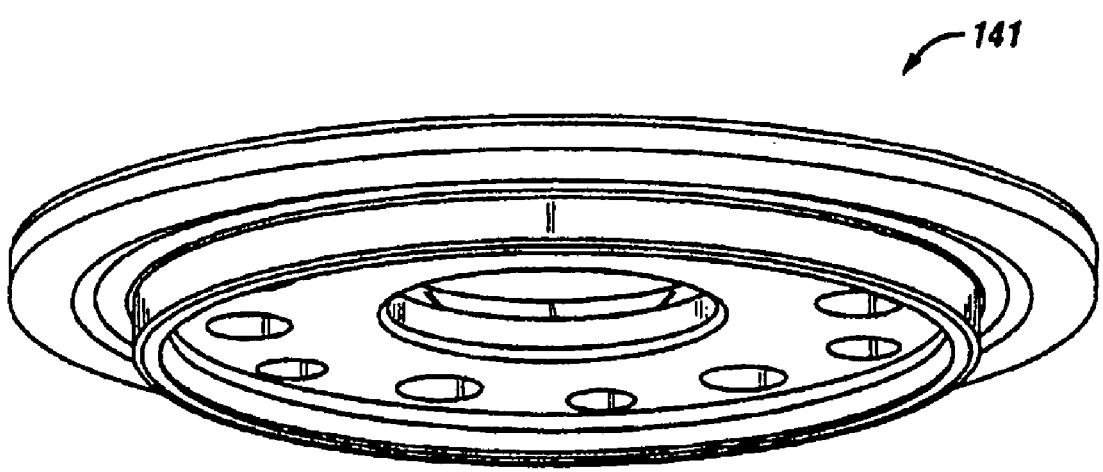
FIG. 2 is a lower isometric view of one embodiment of a disk clamp utilized by the hard disk drive of FIG. 1 and is constructed in accordance with the present invention.
Figure 3:
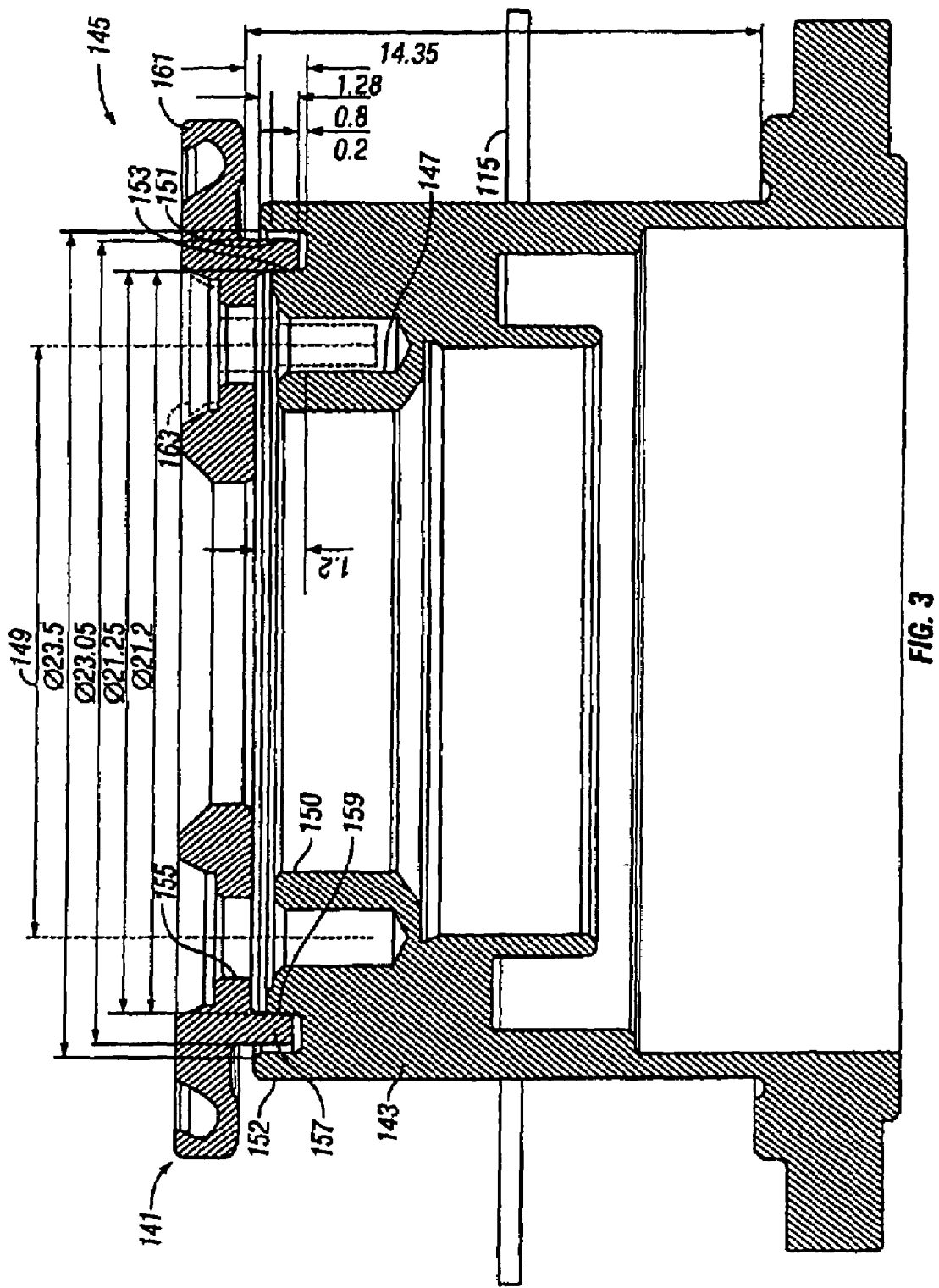
FIG. 3 is a sectional side view of the disk clamp of FIG. 2 mounted to the hub of a spindle motor in the hard disk drive of FIG. 1 and is constructed in accordance with the present invention.

Referring now to FIGS. 2 and 3, one embodiment of a system, method, and apparatus for centering, concentrically aligning, and attaching a disk clamp 141 to a hub 143 of a motor 145 in the hard disk drive 111 is shown. Some of the elements of motor 145 are not illustrated for ease of understanding. The hub 143 has a plurality of fastener openings 147 formed on a bolt circle diameter 149, and an annular recess 151 formed in and circumscribing the hub 143. The annular recess 151 defines an outer wall 153. The bolt circle diameter 149 is radially outboard of a central bore 150 in the hub 143. The hub 143 also has an outer circumference 152 at a perimeter of the hub 143 that is radially outboard of the bolt circle diameter 149. In addition, the annular recess 151 is located radially between the bolt circle diameter 149 and the outer circumference 152.

The disk clamp 141 has a plurality of apertures 155 extending therethrough at the bolt circle diameter 149. An annular rim 157 protrudes from a lower surface of the disk clamp 157, and defines an inner wall 159. The disk clamp 141 is centered on the hub 143 by engaging the inner wall 159 of the disk clamp 141 with the outer wall 153 of the hub 143 such that the annular rim 157 of the disk clamp 141 is closely received by and seats in the annular recess 151 in the hub 143. The disk clamp 141 has an outer clamp circumference 161 at a perimeter, and the annular rim 157 is located radially between the bolt circle diameter 149 of the disk clamp 141 and the outer clamp circumference 161. The disk clamp 141 is assembled to the hub 143 by extending fasteners 163 through the apertures 155 in the disk clamp 141 and into engagement with the fastener openings 147 in the hub 143.

In operation, the present invention comprises a method of concentrically aligning and attaching the disk clamp 141 to the hub 143 of the motor 145 in the hard disk drive 111. The method comprises providing the hub 143 of the spindle motor 145 with the annular recess 151 formed in and circumscribing the hub 143 with the annular recess 151 defines an outer wall 153, and the disk clamp 143 having an annular rim 157 protruding from the disk clamp 141, with the annular rim 157 defining an inner wall 159. A disk 115 is mounted to the hub 143, and the disk clamp 141 is placed on the hub 143 to retain the disk 115 on the hub 143. The annular rim 157 on the disk clamp 141 is aligned with the annular recess 151 in the hub 143, such that the disk clamp 141 is centered on the hub 143 by engaging the inner wall 159 of the disk clamp 141 with the outer wall 153 of the hub 143. The annular rim 157 is closely received and seated in the in the annular recess 151 in the hub 143 to form a disk pack assembly.

As described above, the hub 143 may be provided with a bolt circle diameter 149 that is radially outboard of the central bore 150 in the hub 143, an outer circumference 152 at a perimeter of the hub 143 that is radially outboard of the bolt circle diameter 149, such that the annular recess 151 is located radially between the bolt circle diameter 149 and the outer circumference 152. In addition, the disk clamp 141 may be provided with an outer clamp circumference 161 at a perimeter of the disk clamp 41, such that the annular rim 157 is located radially between the bolt circle diameter 149 and the outer clamp circumference 161. Moreover, the disk clamp 141 is assembled to the hub 143 by extending fasteners 163 through the disk clamp 141 and into engagement with fastener openings 147 in the hub 143.

Figure 4:
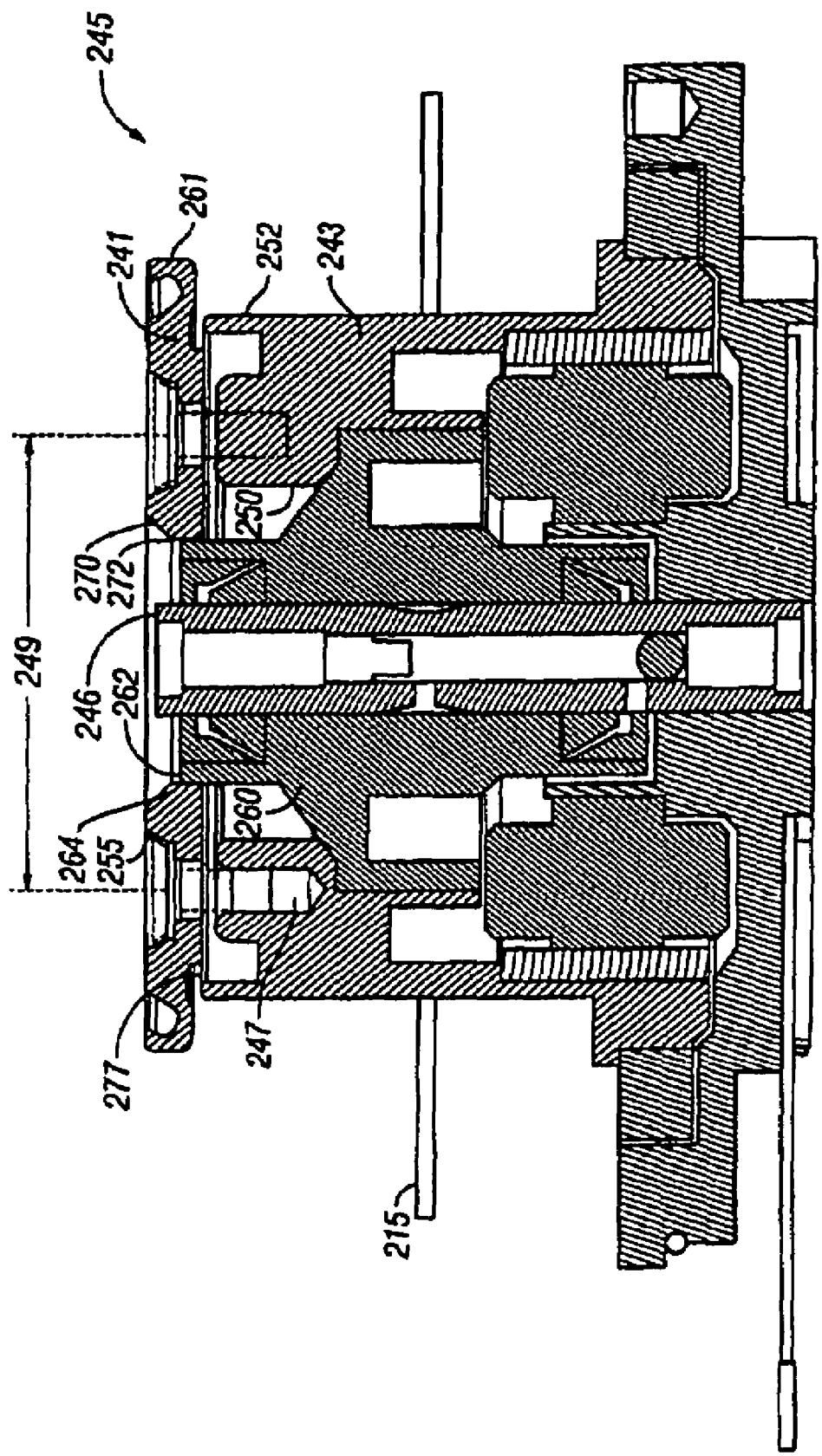
FIG. 4 is a sectional side view of an alternate embodiment of a disk clamp mounted to the bearing sleeve of a spindle motor such as the hard disk drive of FIG. 1 and is constructed in accordance with the present invention.
Figure 5:
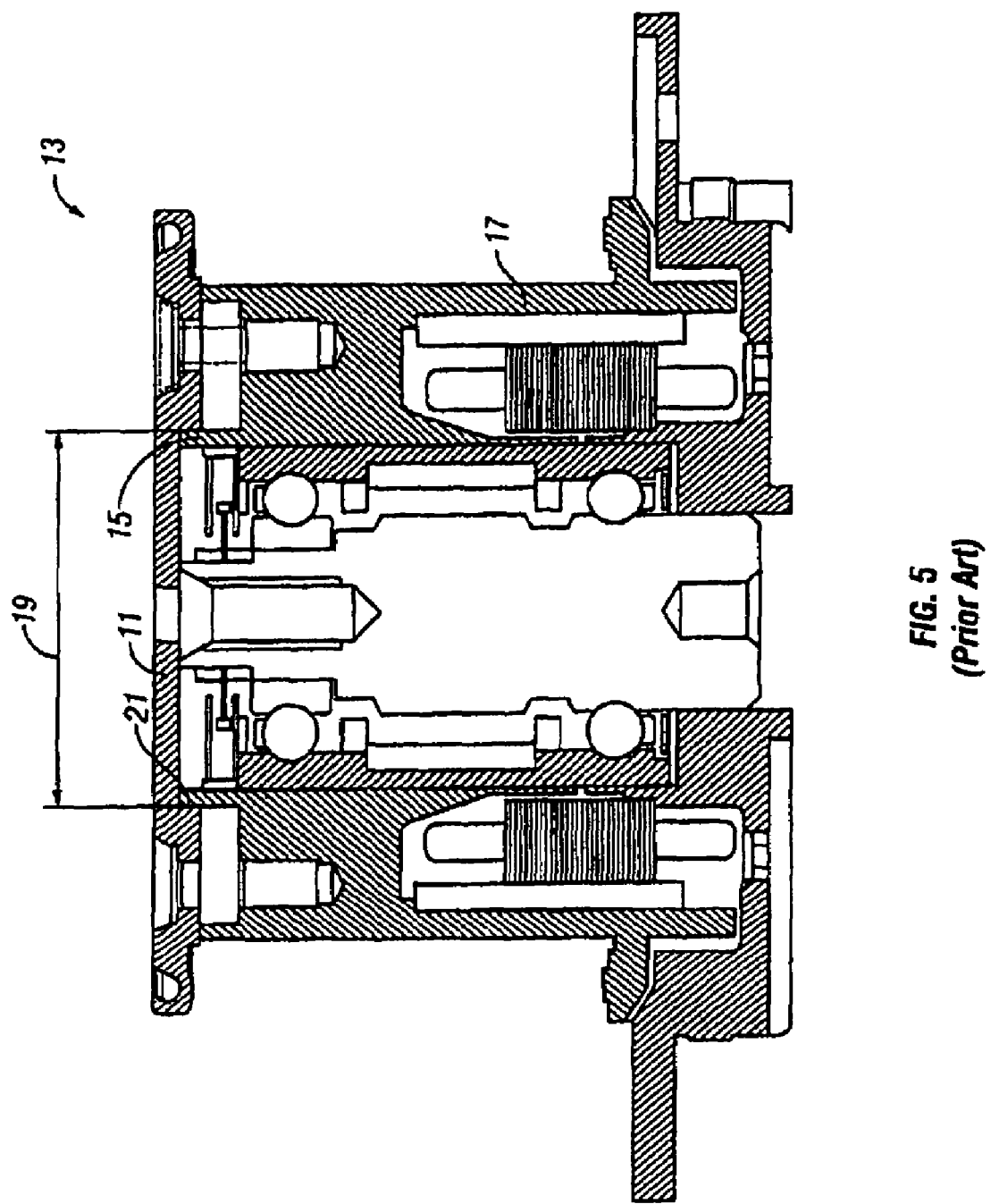
FIG. 5 is a sectional side view of a prior art disk clamp and hub assembly.

Referring now to FIG. 4, an alternate embodiment of the present invention is shown. In this embodiment, a hard disk drive constructed in accordance with the present invention (such as the drive 111 illustrated in FIG. 1) comprises a motor 245 mounted to the enclosure (such as enclosure 113 in FIG. 1). The motor 245 has a shaft 246, a hub 243 with a central bore 250, a plurality of fastener openings 247 formed on a bolt circle diameter 249, an outer circumference 252 at a perimeter of the hub 243, and a bearing assembly 260 that is located radially between the shaft 246 and the hub 243 in the central bore 250 of the hub 243. The bearing assembly 260 has a bearing sleeve 262 that defines an outer wall 264.

A disk clamp 241 has a central opening 270 and a plurality of apertures 255 extending through the disk clamp 241 at the bolt circle diameter 249. The central opening 270 defines an inner wall 272. The disk clamp 241 is concentrically aligned with and attached to the motor 245 by engagement between the inner wall 272 of the disk clamp 241 and the outer wall 264 of the bearing sleeve 262, such that the disk clamp 241 is closely received by and seats on the bearing assembly 260 in the hub 243. A disk 215 for information storage and retrieval is mounted to the hub 243 for rotation therewith. The disk 215 is secured to the hub 243 with the disk clamp 241. As shown in FIG. 1, the actuator assembly 121 is mounted to the enclosure 113 for movement relative to the enclosure 113 and the disk 215. The actuator 121 having a head gimbal assembly 127 with a head 129 for reading data from and writing data to the disk 215.

The bolt circle diameter 249 may be radially outboard of the central bore 250 of the hub 243, the outer circumference 252 of the hub may be radially outboard of the bolt circle diameter 249, and the disk clamp 241 may have an outer clamp circumference 261 at a perimeter of the disk clamp 241. Moreover, the outer wall 264 of the bearing sleeve 262 may protrude axially from the central opening 250 beyond an axial end 277 of the hub 243.

In operation, the second embodiment also comprises a method of concentrically aligning and attaching the disk clamp 241 to the motor 245 in the hard disk drive. The method comprises providing the motor 245 with a hub 243, a shaft 246 located in a bore 250 of the hub 243, and a bearing assembly 260 located between the shaft 246 and the bore 250 of the hub 243, the bearing assembly 260 defining an outer wall 264. The disk 215 is mounted to the hub 243, and the disk clamp 241 is placed on the hub 243 to retain the disk 215 on the hub 243, the disk clamp 241 having a central opening 270 that defines an inner wall 272.

The central opening 270 in the disk clamp 241 is aligned with the bearing assembly 260 in the hub 243, such that the disk clamp 241 is centered on the hub 243 by engaging the inner wall 272 of the disk clamp 241 with the outer wall 264 of the bearing assembly 260. The inner wall 272 is closely received and seated on the outer wall 264 on the bearing assembly 260 to form a disk pack assembly. In addition, the outer wall 264 may be axially extended beyond the axial end 277 of the hub 243.

The present invention has several advantages. The disk clamp solves a number of problems over prior art designs by overcoming issues related to aligning and centering the disk clamp while it is being fastened to the hub of the spindle motor. One embodiment of a disk clamp for securing data storage disks to the hub of a spindle motor in a hard disk drive has a circumferential rib protruding from a lower surface of the disk clamp. A complementary recess is formed in the hub of the spindle motor for closely receiving the rib on the disk clamp. The inner diameter of the rib and the outer diameter of the recess are closely toleranced to provide a very precise centering feature for mounting and aligning the disk clamp with respect to the hub and spindle motor. In an alternate embodiment, the disk clamp is provided with a central aperture that directly engages an end of the upper bearing sleeve which protrudes from the spindle motor hub. In this version, the inner diameter of the aperture and the outer diameter of the bearing sleeve are closely toleranced to provide a very precise centering feature for mounting and aligning the disk clamp with respect to the hub and spindle motor. The present design reduces the complexity of the tooling and fixtures required to complete the assembly and the overall part cost is reduced.

With either of these designs, the disk clamp is precisely centered on the motor to reduce imbalance during rotation with better concentricity over the motor hub. The first design also allows more space to be provided for the motor bearing design and longer bearing span to achieve better performance by locating the centering feature at the outer portion of the motor hub. In addition, clamp stiffness is enhanced and deflection reduced by adding the centering rib on the clamp.

While the invention has been shown or described in only some of its forms, it should be apparent to those skilled in the art that it is not so limited, but is susceptible to various changes without departing from the scope of the invention.

What is claimed is:

1. A system for concentrically aligning and attaching a disk clamp to a hub of a motor in a hard disk drive, comprising:
   a hub of a motor having a plurality of fastener openings formed on a bolt circle diameter, and an annular recess formed in and circumscribing the hub, the annular recess defining an outer wall;
   a disk clamp having a plurality of apertures extending therethrough at the bolt circle diameter, and an annular rim protruding from the disk clamp, the annular rim defining an inner wall;
   the disk clamp being centered on the hub by engaging the inner wall of the disk clamp with the outer wall of the hub such that the annular rim of the disk clamp is closely received by and seats in the annular recess in the hub; and
   the bolt circle diameter is radially outboard of a central bore, and the hub has an outer circumference at a perimeter of the hub that is radially outboard of the bolt circle diameter, and the annular recess is located radially between the bolt circle diameter and the outer circumference.

2. The system of claim 1, wherein the disk clamp has an outer clamp circumference at a perimeter of the disk clamp, and the annular rim is located radially between the bolt circle diameter of the disk clamp and the outer clamp circumference.

3. The system of claim 1, wherein the disk clamp is assembled to the hub by extending fasteners through the apertures in the disk clamp and into engagement with the fastener openings in the hub.

4. A system for concentrically aligning and attaching a disk clamp to a hub of a motor in a hard disk drive, comprising:
   a hub of a motor having a plurality of fastener openings formed on a bolt circle diameter, and an annular recess formed in and circumscribing the hub, the annular recess defining an outer wall that is smooth;
   a disk clamp having a plurality of apertures extending therethrough at the bolt circle diameter, and an annular rim protruding from the disk clamp, the annular rim defining an inner wall tat is smooth;
   the disk clamp being centered on the hub by engaging the inner wall of the disk clamp with the outer wall of the hub such that the annular rim of the disk clamp is closely received by and seats in the annular recess in the hub; and wherein
   the bolt circle diameter is radially outboard of a central bore, and the hub has an outer circumference at a perimeter of the hub that is radially outboard of the bolt circle diameter, and the annular recess is located radially between the bolt circle diameter and the outer circumference.

5. The system of claim 4, wherein the disk clamp has an outer clamp circumference at a perimeter of the disk clamp, and the annular rim is located radially between the bolt circle diameter of the disk clamp and the outer clamp circumference.

6. The system of claim 4, wherein the disk clamp is assembled to the hub by extending fasteners through the apertures in the disk clamp and into engagement with the fastener openings in the hub.

7. A method of concentrically aligning and attaching a disk clamp to a hub of a motor in a hard disk drive, the method comprising:

(a) providing a hub of a motor with an annular recess formed in and circumscribing the hub, the annular recess defining an outer wall, a disk clamp having an annular rim protruding from the disk clamp, the annular rim defining an inner wall, and providing the disk clamp with an outer clamp circumference at a perimeter of the disk clamp, and locating the annular rim radially between a bolt circle diameter of the disk clamp and the outer clamp circumference;

(b) mounting a disk to the hub;

(b) placing the disk clamp on the hub to retain the disk on the hub;

(c) aligning the annular rim on the disk clamp with the annular recess in the hub, such that the disk clamp is centered on the hub by engaging the inner wall of the disk clamp with the outer wall of the hub; and (d) closely receiving and seating the annular rim of the disk clamp in the annular recess in the hub to form a disk pack assembly.

8. The method of claim 7, wherein step (a) comprises providing the hub with a hub bolt circle diameter that is radially outboard of a central bore in the hub, an outer circumference at a perimeter of the hub that is radially outboard of the hub bolt circle diameter, and locating the annular recess radially between the hub bolt circle diameter and the outer circumference.

9. The method of claim 7, further comprising the step of assembling the disk clamp to the hub by extending fasteners through the disk clamp and into engagement with fastener openings in the hub.

* * * * *